United States Patent
Jia et al.

(10) Patent No.: US 9,734,074 B2
(45) Date of Patent: Aug. 15, 2017

(54) DATA COPY AVOIDANCE ACROSS A STORAGE

(71) Applicant: EMC Corporation, Hopkinton, MA (US)

(72) Inventors: Ruiyong Jia, Beijing (CN); Lei Xue, Beijing (CN); Long Zhang, Beijing (CN); Jian Gao, Beijing (CN); Peng Xie, Beijing (CN); Huibing Xiao, Beijing (CN); Zhipeng Hu, Beijing (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 170 days.

(21) Appl. No.: 14/573,782

(22) Filed: Dec. 17, 2014

(65) Prior Publication Data

US 2015/0178213 A1    Jun. 25, 2015

(30) Foreign Application Priority Data

Dec. 23, 2013    (CN) .......................... 2013 1 0724717

(51) Int. Cl.
*G06F 12/08* (2016.01)
*G06F 3/06* (2006.01)
*G06F 12/0868* (2016.01)

(52) U.S. Cl.
CPC .......... *G06F 12/0868* (2013.01); *G06F 3/067* (2013.01); *G06F 3/0608* (2013.01); *G06F 3/0647* (2013.01); *G06F 2212/286* (2013.01); *G06F 2212/314* (2013.01)

(58) Field of Classification Search
None
See application file for complete search history.

(56) References Cited

U.S. PATENT DOCUMENTS

| | | | | |
|---|---|---|---|---|
| 5,742,792 | A | * | 4/1998 | Yanai .................... G06F 3/0601 710/1 |
| 6,973,484 | B1 | * | 12/2005 | Singhal ............... G06F 12/0813 709/216 |
| 2006/0101081 | A1 | * | 5/2006 | Lin .................... G06F 17/30362 |
| 2008/0301256 | A1 | * | 12/2008 | McWilliams ....... G06F 12/0284 709/214 |

(Continued)

OTHER PUBLICATIONS

J. C. Brustoloni, "Interoperation of copy avoidance in network and file I/O," INFOCOM '99. Eighteenth Annual Joint Conference of the IEEE Computer and Communications Societies. Proceedings. IEEE, New York, NY, 1999, pp. 534-542 vol. 2.*

*Primary Examiner* — Edward Dudek, Jr.
*Assistant Examiner* — Ralph A Verderamo, III
(74) *Attorney, Agent, or Firm* — Krishnendu Gupta; Joseph D'Angelo

(57) ABSTRACT

Embodiments of the present disclosure relate to methods and apparatuses for data copy avoidance where after a data access request is received from the first storage node, what is sent by a second storage node to the first storage node is not an address of a second storage space in a second mirrored cache, but an address of a first storage space in a first cache corresponding to the second storage space. In this way, data access may be implemented directly in the first cache on the first storage node, and can reduce data communication across different storage nodes, eliminate potential system performance bottlenecks, and enhance data access performance.

10 Claims, 5 Drawing Sheets

(56) References Cited

U.S. PATENT DOCUMENTS

| | | | |
|---|---|---|---|
| 2010/0199042 A1* | 8/2010 | Bates | H04L 67/289 |
| | | | 711/114 |
| 2012/0303883 A1* | 11/2012 | Bakke | G06F 12/0868 |
| | | | 711/105 |
| 2012/0330898 A1* | 12/2012 | BK | G06F 11/2089 |
| | | | 707/659 |

* cited by examiner

DATA COPY AVOIDANCE ACROSS A STORAGE

RELATED APPLICATION

This Application claims priority from Provisional Application Serial No. CN201310724717.6 filed on Dec. 23, 2013 entitled "Method for Cross-SP Data Copy Avoidance," the content and teachings of which are hereby incorporated by reference in their entirety.

FIELD OF THE INVENTION

The present disclosure generally relates to storage management, and more specifically, relates to a data copy avoidance across storage nodes.

BACKGROUND OF THE INVENTION

In order to avoid unnecessary internal data copy between different layers of a storage array, a data copy avoidance (DCA) protocol has been proposed. According to the DCA protocol, when a driver in a hierarchical structure or a host issues a data read or data write command, the request will be directly passed down to a device stack without going through any buffer area. When the data access command reaches a cache layer, the cache layer provides a corresponding buffer area (also referred to as "cache page"), and the data can be directly communicated between the access command initiator and the cache, without additional data copy. The DCA protocol helps to enhance the efficiency of data access.

However, current DCA solutions are not only suitable for a single storage node, but cannot be effectively implemented across different physical storage nodes. For a storage system consisting of two or more physical storage nodes, under a particular condition, it is required to redirect data output/input (I/O) operations from one storage node to another storage node. For example, when a logical unit number (LUN) presented to the host is a virtual LUN, it might be required to redirect the I/O operations from the local storage node to another separate storage node. In the known DCA solution, with data write as an example, the data will be first transmitted to an internal buffer area of the initiating storage node, and then delivered to a mirrored cache in the destination storage node. At this point, as already known, the DCA protocol requires that the mirrored cache in the destination storage node further mirrors these data back to the mirrored cache of the initiating storage node. Therefore, in one data write operation, the data have to be transmitted twice between different storage nodes, which wastes resources and deteriorates operation efficiency. Similarly, the current DCA-based across-storage node data read is likewise restricted to the above problem.

SUMMARY OF THE INVENTION

In order to solve the above problem, the present invention provides a more efficient technical solution for data copy avoidance across storage nodes.

According to one aspect of the present disclosure, there is provided a method for data copy avoidance across storage nodes. The method includes sending a data access request from a first storage node to a second storage node, the data access request indicating an address associated with the second storage node; receiving, from the second storage node, an address of a first storage space in a first mirrored cache at the first storage node, the first storage space being allocated in association with a second storage space in a second mirrored cache at the second storage node, and the second storage space being allocated by the second storage node in response to the data access request; and performing the data access using the first storage space based on the received address.

According to a further aspect of the present disclosure, there is provided a method for data copy avoidance across storage nodes. The method includes receiving, at a second storage node, a data access request from a first storage node, the data access request indicating an address associated with the second storage node; and allocating a second storage space in a second mirrored cache at the second storage node based on the data access request; and sending, to the first storage node, an address of a first storage space in a first mirrored cache at the first storage node, the first storage space being allocated in association with the second storage space.

According to a further aspect of the present disclosure, there is provided an apparatus for data copy avoidance across storage nodes. The apparatus includes a data copy unit configured to send a data access request from a first storage node to a second storage node, the data access request indicating an address associated with the second storage node; the data copy unit further configured to receive, from the second storage node, an address of a first storage space in a first mirrored cache at the first storage node, the first storage space being allocated in association with a second storage space in a second mirrored cache at the second storage node, and the second storage space being allocated by the second storage node in response to the data access request; and the data copy unit further configured to perform the data access using the first storage space based on the received address.

According to a yet a further aspect of the present disclosure, there is provided an apparatus for data copy avoidance across storage nodes. The apparatus includes a data copy unit configured to receive, at a second storage node, a data access request from a first storage node, the data access request indicating an address associated with the second storage node; and the data copy unit further configured to allocate a second storage space in a second mirrored cache at the second storage node based on the data access request; and the data copy unit further configured to send, to the first storage node, an address of a first storage space in a first mirrored cache at the first storage node, the first storage space being allocated in association with the second storage space.

It would be understood through the following description that according to the embodiments of the present disclosure, information sent by the destination storage node to the first storage node is not the address of the second storage space in the second mirrored cache any longer. Instead, the second storage node sends the address of the first storage space in the first cache corresponding to the second storage space to the first cache. The DCA protocol guarantees that it is feasible. Accordingly, the data access may be completed in the first cache on the first storage node. Compared with the prior art, embodiments of the present disclosure significantly lowers data communication across different storage nodes, eliminates potential system performance bottleneck, and improves data access performance. Other advantages achieved by the embodiments of the present disclosure will be become clearer through the following description.

BRIEF DESCRIPTION OF THE DRAWINGS

The above and other objectives, features and advantages of the embodiments of the present disclosure will become more comprehensible through the following detailed description with reference to the accompanying drawings. In the drawings, several embodiments of the present invention are illustrated exemplarily, rather than restrictively, wherein.

Throughout the drawings, same or corresponding reference numerals represent same or corresponding parts.

DETAILED DESCRIPTION

Hereinafter, the principle of the present disclosure will be described with reference to several exemplary embodiments shown in the figures. It should be understood that description of these embodiments is only for enabling those skilled in the art to better understand and then implement the present disclosure, not for limiting the scope of the present disclosure in any manner.

Figure 1:
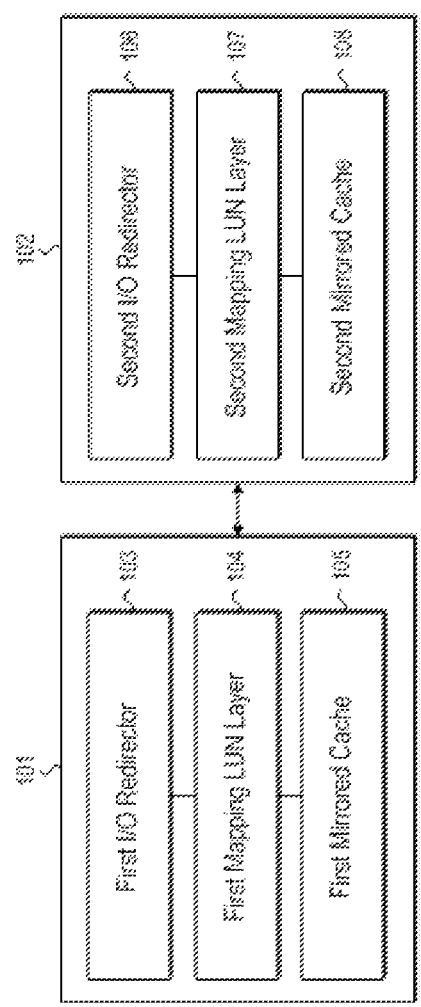
FIG. 1 shows a block diagram of two exemplary hierarchical-type storage nodes.

FIG. 1 shows two exemplary hierarchical-type storage nodes, i.e., first storage node 101 and second storage node 102. As shown in the figure, the first storage node 101 comprises a first I/O redirector 103, a first mapping LUN layer, and a first mirrored cache 105. It should be noted that the first storage node 101 may also include any other suitable components, such as a miniport, a bottom-layer Redundant Arrays of independent Disks (RAID), etc. In order to avoid ambiguity, these components are not shown in the figure. Similarly, the second storage node 102 includes a second I/O redirector 106, a second LUN layer 107, and a second mirrored cache 108.

First, a conventional DCA solution will be described with reference to FIG. 1. As an example, consider the data access instruction received by the first storage node 101 to be a data write instruction. For example, the first storage node may receive a data write command from a host via an appropriate terminal. The first storage node 101 determines that an address associated with the data write command (e.g., virtual LUN) is owned by the second storage node 102. At this point, the first I/O redirector 103 of the first storage node 101 sends the data write request to the second I/O redirector 106 of the second storage node 103.

Based on the data access request, a second mapping LUN at the second storage node 102 determines a destination address (e.g., destination virtual LUN), and maps it to a LUN provided by a bottom-layer hardware device (e.g., RAID). Subsequently, based on the data write request, an appropriate storage space, e.g., a group of cache pages, is allocated to the second mirrored cache 108 in the second storage node 102. The address of the allocated storage space is passed upwards to the second mapping LUN layer 107 and the second I/O redirector 106 layer by layer. The second I/O redirector 106 of the second storage node 102 returns the address of the allocated storage space to the first I/O redirector 103 of the first storage node 101.

The first I/O redirector 103 notifies the upper layer to initiate a data transfer, and the data is written into a buffer area at the first I/O redirector 103. Based on the received address, the first I/O redirector 103 stores data into the allocated storage space of the second mirrored cache 108 of the second storage node 102 via a common message link (CMI) between the first storage node 101 and the second storage node 102. At this point, based on the DCA protocol, the second mirrored cache 108 will mirror the written data into the first mirrored cache 105 of the first storage node 101 (otherwise, any data update in the first mirrored cache 105 will also be mirrored to the second mirrored cache 108).

In other words, according to the current DCA solution, during one procedure of data write operation, data is copied twice between different storage nodes. This will deteriorate the operation efficiency and causes communication resources between storage nodes to become a potential bottleneck for system performance. According to the current DCA solution, data read will also have a similar problem. Traditionally, since the second storage node 102 returns the address of the storage space allocated in the second mirrored cache 108 to the first storage node 101, each data read performed by the first storage node 108 will incur data communication between two storage nodes, which will significantly increase overheads and deteriorate performance.

Figure 2:
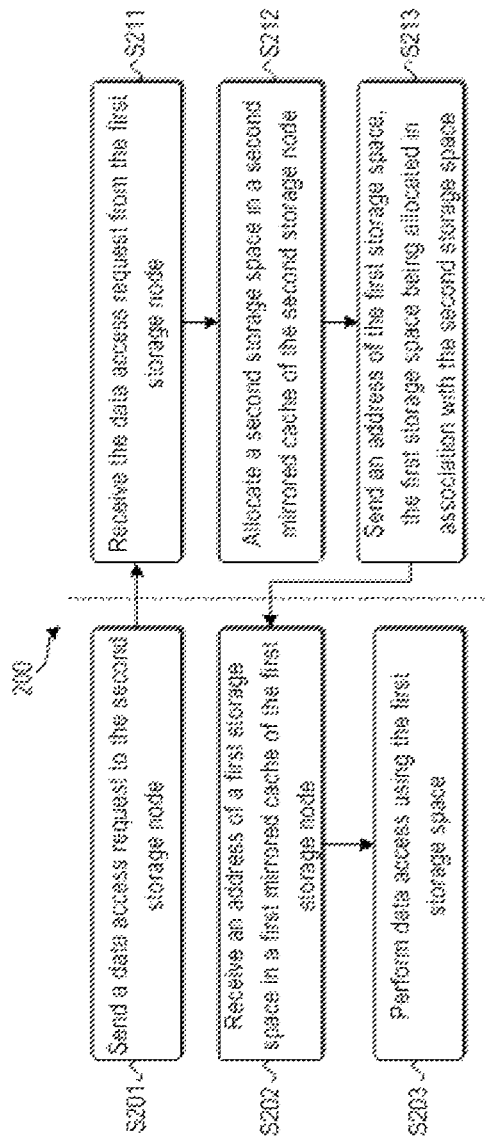
FIG. 2 shows a flow chart of a method for data copy avoidance across storage nodes according to exemplary embodiments of the present disclosure.

In order to overcome the above drawbacks, embodiments of the present disclosure provide a brand-new DCA solution. FIG. 2 illustrates a flow chart of a method 200 for data copy avoidance according to the exemplary embodiments of the present disclosure. For convenience of discussion, in the embodiments below, two different data storage nodes, i.e., a first storage node and a second storage node, are described. However, it should be understood that the embodiments of the present disclosure may be applied to a storage system comprising any number of storage nodes. It should be further noted that, in FIG. 2, steps at the left side of the dotted line are performed by the first storage node, while steps at the right side of the dotted line are performed by the second storage node.

As described above, the first storage node receives a data access request from, for example, a host, and decides that the data address for the data access request is not at the first storage node, but associated with an independent second storage node. In step S201, the data access request is sent from the first storage node to the second storage node. In some embodiments, the data access request may be forwarded, for example, by the I/O redirector in the first storage node to the I/O redirector in the second storage node. Of course, the above are only exemplary, and dependent on different implementations, and any appropriate mechanism may be employed to send a data access request between the first storage node and the second storage node.

Correspondingly, at step S211, the second storage node receives the data access request from the first storage node. At step S212, the second storage node allocates a storage space (called "second storage space") in a second mirrored cache at the second storage node. As an example, in the hierarchical storage structure as depicted above reference to FIG. 1, the second I/O redirector of the second storage node sends a data access request downwards, the second mapping LUN layer determines a target virtual LUN, and allocates a group of mirrored cache pages as the second storage space in the second mirrored cache.

It can be observed from the DCA mechanism that after the second storage space is allocated in the second mirrored cache at the second storage node, the first mirrored cache at the first storage node will allocate a corresponding storage space (called "first storage space") in association with the second storage space. For example, the first storage space may be a group of cache pages in the first mirrored cache. In particular, the address of the first storage space in the first mirrored cache is known to the second storage node, which is guaranteed by the mirrored cache mechanism. For example, the address of the first storage space is notified to the second storage node in accordance with the DCA protocol, which is not described in detail in this application.

Next, in step S213, the second storage node sends, to the first storage node, the address of the first storage space in the first mirrored cache at the first storage node as known according to the DCA protocol. For example, in the exemplary hierarchical storage structure as described with reference to FIG. 1, the second mirrored cache 108 of the second storage node 102 may send the address of the first storage space to the second mapping LUN layer 107. The second mapping LUN layer 107 in turn sends the address of the first storage space upwards to the second I/O redirector 106. The second I/O redirector 106 sends the address to the first I/O redirector 103 of the first storage node 101.

Correspondingly, in step S202, the first storage node receives, from the second storage node, the address of the first storage space in the first mirrored cache at the first node. Next, in step S203, based on received address of the first storage space, the first storage node performs a data access operation using the received address of the first storage space.

For the sake of illustration, several exemplary embodiments of the method 200 are described with reference to the exemplary architecture depicted in FIG. 1. First, consider an example where the data access request is a data write request. According to the embodiments of the present disclosure, as stated above, in response to a destination address of the writing operation is associated with the second storage node 102, the first storage node 101 sends the data write request to the second I/O redirector of the second storage node 102 for example through the first I/O redirector 103. According to a similar process as described above, at the second storage node 102, the second mapping LUN layer 107 determines the address (e.g., destination virtual LUN), and the second mirrored cache 108 allocated an appropriate second storage space for writing data.

According to the DCA protocol, after the second storage space is allocated, in the first mirrored cache 105 at the first storage node, a first storage space is allocated in association with the second storage space. Besides, the DCA protocol guarantees that the address of the first storage space in the first mirrored cache 105 is known to the second storage node 103. In this way, the second storage node 102 returns the address of the first storage space in the first mirrored cache 105 to the first storage node 101, rather than returning the address of the second storage space in the second mirrored cache 108.

Correspondingly, after receiving the address of the first storage space from the second storage node 102, the first storage node 101 may directly write data into the first storage space in the first mirrored cache 105 based on the address. According to the DCA protocol, after being written into the first storage space, the data will be mirrored into the second storage space of the second mirrored cache of the second storage node 102. For example, in some embodiments, the data may be mirrored by CMI between the first storage node 101 and the second storage node 102. In this way, the data may be written into the bottom-layer storage device of the second storage thereafter, thereby completing data write.

According to some embodiments of the present disclosure, after to-be-written data is mirrored to the second mirrored cache 108 of the second storage node 102, the first storage node 101 may notify the second storage node 102 that data mirror is completed. As a response, the second storage node 102 may in turn send a data write success message to the first storage node 101. For example, in some embodiments, the second mirrored cache 108 may notify the data write complete operation/command/notification to the upper second mapping LUN layer 107. The second mapping LUN layer 107 submits "dirty" metadata, and notifies the write complete notification to the second I/O redirector 106. The second I/O redirector 106 in turn sends the data write complete message to the first I/O redirector 103 of the first storage node 101, and the first redirector 103 may send the message to the initiator of the data writing request, e.g., a host, so as to complete the data write operation.

Still with reference to FIG. 1, an example is described, wherein the data access request is a data read request. According to the embodiment of the present disclosure, the data read request operation/command/notification is sent from the first storage node 101 to the second storage node 102. As a response, the second mirrored cache 108 of the second storage node 102 is allocated to the second storage space. The data to be read is stored in the second storage space. According to the DCA protocol, the data stored in the second storage space is mirrored into the first storage space in the first mirrored cache 105 of the first storage node 101. As stated above, the first storage space is allocated in association with the second storage space.

Subsequently, according to the embodiment of the present disclosure, the second storage node 102 sends the address of the first storage space to the first storage node 101. In this way, the first storage node 101 may read data directly from the first storage space. In the subsequent read operation, the data may be directly read from the first cache 105 that is local to the first storage node 101, without a need to trigger again the data communication between the first storage node 101 and the second storage node 102.

It would be understood from the above description that according to the embodiments of the present disclosure, what is sent by the second storage node to the first storage node is not the address of the second storage space in the second mirrored cache any longer. Instead, the second storage node sends the address the first storage space information in the first cache corresponding to the second storage space in the first cache. The DCA protocol guarantees that it is feasible. In this way, the data access may be performed in the first cache on the first storage node. As far as data write is concerned, the traditional DCA needs to transfer the same data twice on CMI. According to the embodiments of the present disclosure, data needs to be transferred only once. As far as data read is concerned, according to the embodiments of the present disclosure, the data is retrieved back into the local cache. In this way, each data read thereafter will directly hit in the local cache. Therefore, embodiments of the present disclosure significantly lower data communication across different storage nodes, and eliminates potential system performance bottleneck, thereby enhancing data access performance.

Figure 3:
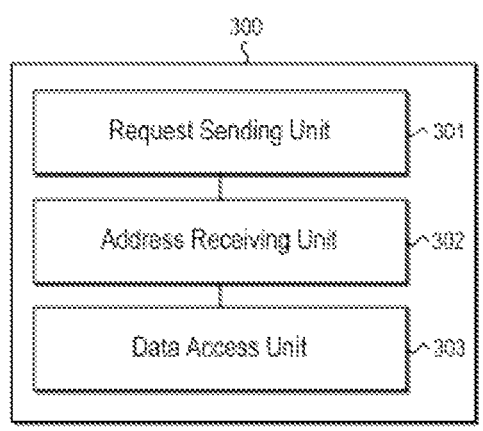
FIG. 3 shows a block diagram of an apparatus for data copy avoidance across storage nodes according to exemplary embodiments of the present disclosure.

FIG. 3 shows a block diagram of an apparatus 300 for data copy avoidance across storage nodes according to exemplary embodiments of the present disclosure. According to the embodiments of the present disclosure, the apparatus 300 may operate in conjunction with the first storage node 101 as described above.

As shown in FIG. 3, according to the embodiments of the present disclosure, the apparatus 300 comprises: a requesting unit 301 configured to send a data access request from a first storage node to a second storage node, the data access request indicating an address associated with the second storage node; an address receiving unit 302 configured to receive, from the second storage node, an address of a first storage space in a first mirrored cache at the first storage node, the first storage space being allocated in association with a second storage space in a second mirrored cache at the second storage node, and the second storage space being allocated by the second storage node in response to the data access request; and a data access unit 303 configured to perform the data access using the first storage space based on the received address. Each of these requesting unit 301, address receiving unit 302 and data access unit 303 can be combined into a single data copy unit (not shown in the figured), wherein the data copy unit which is configured to perform the tasks of each of these individual units collectively.

In some embodiments of the present invention, the data access request is a data write request, and the data access unit 303 comprises: a data writing unit configured to directly write the data into the first storage space, such that the data is mirrored from the first storage space into the second storage space. Alternatively, the apparatus 300 may further comprise: a write complete receiving unit configured to receive a data write complete message from the second storage node, the complete message being sent by the second storage node in response to the data being mirrored to the second storage space. The data writing unit in one embodiment can be combined into a single data copy unit (not shown in the figured), wherein the data copy unit which is configured to perform the tasks of each of these individual units collectively.

Alternatively or additionally, the data access request is a data read request, and the data access unit 303 further comprises: a data reading unit configured to directly read the data from the first storage space, the data being mirrored from the second storage space to the first storage space. The data reading unit in one embodiment can be combined into a single data copy unit (not shown in the figured), wherein the data copy unit which is configured to perform the tasks of each of these individual units collectively In some embodiments of the present disclosure, the data may be mirrored between the second storage space and the first storage space via a common message link CMI between the first storage node and the second storage node.

Figure 4:
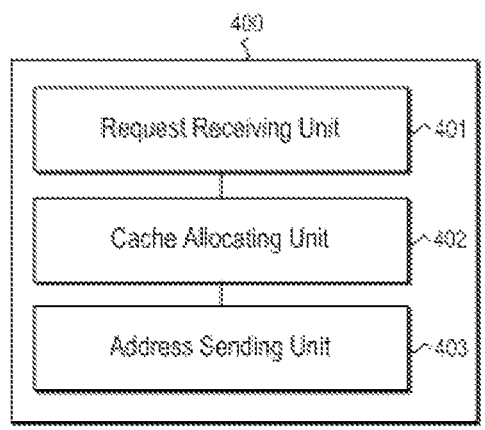
FIG. 4 shows a block diagram of an apparatus for data copy avoidance across storage nodes according to exemplary embodiments of the present disclosure.

FIG. 4 illustrates a block diagram of an apparatus 400 for data copy avoidance across storage nodes according to exemplary embodiments of the present invention. According to the embodiments of the present disclosure, the apparatus 400 may operate in conjunction with the second storage node 102 as described above.

As shown in FIG. 4, according to the embodiments of the present disclosure, the apparatus 400 comprises: a request receiving unit 401 configured to receive, at a second storage node, a data access request from a first storage node, the data access request indicating an address associated with the second storage node; and a cache allocating unit 402 configured to allocate a second storage space in a second mirrored cache at the second storage node based on the data access request; and an address sending unit 403 configured to send, to the first storage node, an address of a first storage space in a first mirrored cache at the first storage node, the first storage space being allocated in association with the second storage space. In one embodiment the above mentioned request receiving unit, cache allocating unit and address sending unit can be combined into the data copy unit (not shown in the figured), wherein the data copy unit which is configured to perform the tasks of each of these individual units collectively In some embodiments of the present disclosure, the data access request is a data write request, and the data written into the first storage space based on these data is mirrored into the second storage space. In some embodiments of the present disclosure, the apparatus 400 may further include: a write complete sending module configured to send a data write complete message from the second storage node to the first storage node in response to the data being mirrored to the second storage space. In one embodiment the write complete sending module can be combined into the data copy unit (not shown in the figured), wherein the data copy unit which is configured to perform the tasks of each of these individual units collectively.

In some embodiments of the present disclosure, the data is mirrored between the second storage space and the first storage space via a common message link CMI between the first storage node and the second storage node.

In some embodiments of the present disclosure, the data is mirrored between the second storage space and the first storage space via a common message link CMI between the first storage node and the second storage node.

For the sake of clarity, some optional components of apparatuses 300 and 400 are not shown in FIGS. 3 and 4. However, it should be understood that various features as described with reference to the method of the present disclosure are likewise applicable to apparatuses 300 and 400. Besides, various units in apparatuses 300 and 400 may be hardware modules or software unit modules. For example, in some embodiments, the apparatuses 300 and 400 may be partially or completely implemented using software and/or firmware, e.g., implemented as a computer program product embodied on a compute readable medium. Alternatively or additionally, the apparatuses 300 and 400 may be partially or completely implemented based on hardware, e.g., an integrated circuit (IC) chip or an application specific integrated circuit (ASIC), a system on chip (SOC), a field programmable gate array (FPGA), etc. The scope of the present disclosure is not limited in this aspect.

Figure 5:
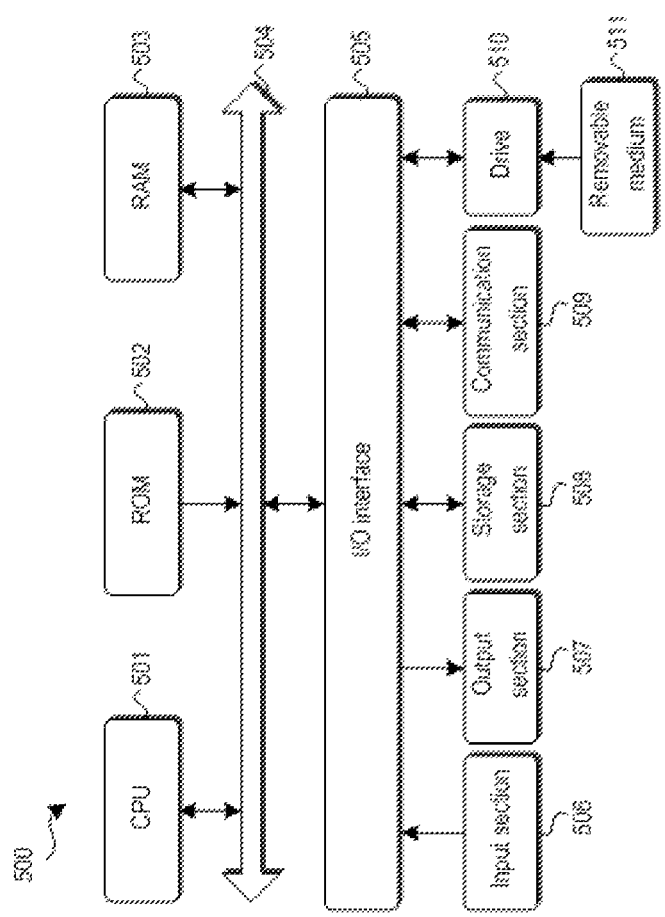
FIG. 5 shows a block diagram of a computer system suitable for implementing the exemplary embodiments of the present disclosure.

FIG. 5 shows a schematic block diagram of a computer that is adapted to implement the embodiments of the present disclosure. As shown in FIG. 5, the computer 500 includes a CPU (Central Processing Unit) 501, which may perform various appropriate actions and processing based on the program stored in the read-only memory (ROM) 502 or the program loaded from the memory section 508 to the random access memory (RAM). In RAM 503, there further stores various programs and data needed by operation of the apparatus 500. COU 501, ROM 502, and RAM 503 are connected one another via a bus 504. The input/output (I/O) interface is also connected to the bus 504.

The following components are connected to the I/O interface 505: an input section 506 comprising a keyboard, a mouse, and the like; an output section 507 including such as CRT (Cathode Ray Tube), LCD (Liquid Crystal Display), and loudspeakers; a memory section 508 including a hard disk and the like; and a communication section 509 including a network interface card such as LAN card, Modem, etc. The communication section 509 performs communication processing via a network such as Internet. A driver 510 is also connected to the I/O interface 505 as required. A removable medium 511, such as a magnetic disk, an optical disk, a magnetic-optical disk, a semiconductor memory, etc., are mounted on the driver 510 as required, such that the computer program read from thereon are mounted into the memory section 508 as required.

In particular, according to the embodiments of the present disclosure, the process as described above with reference 2 may be implemented as a computer software program. For example, embodiments of the present disclosure include a computer program product, which includes a computer program tangibly embodied on the machine-readable medium. The computer program includes program code for performing the method 200. In such embodiments, the computer program may be downloaded from the communication section 509 and installed, and/or installed from the removable medium 511.

Generally, various exemplary embodiments of the present disclosure may be implemented in hardware or application-specific circuit, software, logic, or in any combination thereof. Some aspects may be implemented in hardware, while the other aspects may be implemented in firmware or software executed by a controller, a microprocessor or other computing device. When various aspects of the present disclosure are illustrated or described into block diagrams, flow charts, or other graphical representations, it would be understood that the block diagrams, apparatus, system, technique or method described here may be implemented, as non-restrictive examples, in hardware, software, firmware, dedicated circuit or logic, common software or controller or other computing device, or some combinations thereof.

Besides, each block in the flowchart may be regarded as a method step or an operation generated by operating computer program code, and/or understood as a plurality of coupled logic circuit elements performing relevant functions. For example, embodiments of the present disclosure include a computer program product that includes a computer program tangibly embodied on a machine-readable medium, which computer program includes program code configured to implement the method described above.

In the context of the present disclosure, the machine-readable medium may be any tangible medium including or storing a program for or about an instruction executing system, apparatus or device. The machine-readable medium may be a machine-readable signal medium or machine-readable storage medium. The machine-readable medium may include, but not limited to, electronic, magnetic, optical, electro-magnetic, infrared, or semiconductor system, apparatus or device, or any appropriate combination thereof. More detailed examples of the machine-readable storage medium includes, an electrical connection having one or more wires, a portable computer magnetic disk, hard drive, random-access memory (RAM), read-only memory (ROM), erasable programmable read-only memory (EPROM or flash memory), optical storage device, magnetic storage device, or any appropriate combination thereof.

The computer program code for implementing the present disclosure may be complied with one or more programming languages. These computer program codes may be provided to a general-purpose computer, a dedicated computer or a processor of other programmable data processing apparatus, such that when the program codes are executed by the computer or other programmable data processing apparatus, the functions/operations prescribed in the flow chart and/or block diagram are caused to be implemented. The program code may be executed completely on a computer, partially on a computer, partially on a computer as an independent software packet and partially on a remote computer, or completely on a remote computer or server.

Besides, although the operations are depicted in a particular sequence, it should not be understood that such operations are completed in a particular sequence as shown or in a successive sequence, or all shown operations are executed so as to achieve a desired result. In some cases, multi-task or parallel-processing would be advantageous. Likewise, although the above discussion includes some specific implementation details, they should not be explained as limiting the scope of any invention or claims, but should be explained as a description for a particular embodiment of a particular disclosure. In the present disclosure, some features described in the context of separate embodiments may also be integrated into a single embodiment. On the contrary, various features described in the context of a single embodiment may also be separately implemented in a plurality of embodiments or in any suitable sub-group.

Various amendments and alterations to the exemplary embodiments of the description as above described would become apparent to a person skilled in the relevant art when viewing the above description in connection with the drawings. Any and all amendments still fall within the scope of the non-limiting exemplary embodiments of the present disclosure. Besides, the above description and drawings off an advantage of teaching, and technicians relating to the technical field of these embodiments of the present invention would envisage other embodiments of the present disclosure as expounded here.

It would be appreciated that the embodiments of the present disclosure are not limited to the specific embodiments as disclosed, and the amendments and other embodiments should all be included within the appended claims. Although particular terms are used herein, they are used only in their general and descriptive senses, without a purpose of limiting.

What is claimed is:

1. A method for data copy avoidance across storage nodes, the method comprising:
    sending a data access request from a first storage node to a second storage node, the data access request comprising an address associated with the second storage node;
    receiving, from the second storage node, an address of a first storage space in a first mirrored cache associated with the first storage node, the first storage space being allocated in association with a second storage space in a second mirrored cache associated with the second storage node, and the second storage space being allocated by the second storage node in response to the data access request; and
    accessing the first storage space based on the received address.

2. The method according to claim 1, wherein the data access request is a data write request, and wherein accessing the first storage space comprises:
    directly writing the data into the first storage space, such that the data is mirrored from the first storage space to the second storage space; and
    receiving a data write complete message from the second storage node, the data write complete message being sent by the second storage node in response to the data being mirrored to the second storage space.

3. The method according to claim 1, wherein the data access request is a data reading request, and accessing the first storage space comprises:

directly reading the data from the first storage space, the data being mirrored from the second storage space to the first storage space.

4. The method according to claim 1, wherein the data is mirrored between the second storage space and the first storage space via a common message link (CMI) between the first storage node and the second storage node.

5. An apparatus for data copy avoidance across storage nodes, the apparatus comprising:
a data copy unit configured to
send a data access request from a first storage node to a second storage node, the data access request comprising an address associated with the second storage node;
receive, from the second storage node, an address of a first storage space in a first mirrored cache at the first storage node, the first storage space being allocated in association with a second storage space in a second mirrored cache at the second storage node, and the second storage space being allocated by the second storage node in response to the data access request; and
accessing the first storage space based on the received address.

6. The apparatus according to claim 5, wherein the data access request is a data write request, and further configured to
directly write the data into the first storage space, such that the data is mirrored from the first storage space to the second storage space.

7. The apparatus according to claim 6, further configured to:
receive a data write complete message from the second storage node, the complete message being sent by the second storage node in response to the data being mirrored to the second storage space.

8. The apparatus according to claim 5, wherein the data access request is a data reading request, and further configured to:
read the data from the first storage space, the data being mirrored from the second storage space to the first storage space.

9. The apparatus according to claim 5, wherein the data is mirrored between the second storage space and the first storage space via a common message link (CMI) between the first storage node and the second storage node.

10. A computer program product for data copy avoidance across storage nodes, which computer program product is tangibly stored on a non-transient computer-readable medium and includes a machine-executable instruction which, when being executed, causes a machine to perform
sending a data access request from a first storage node to a second storage node, the data access request comprising an address associated with the second storage node, the data access request comprises at least one of
a data write request, and wherein accessing a first storage space comprises: directly writing the data into the first storage space, such that the data is mirrored from the first storage space to a second storage space OR a data reading request, and accessing the first storage space comprises directly reading the data from the first storage space, the data being mirrored from the second storage space to the first storage space; and
receiving a data write complete message from the second storage node, the data write complete message being sent by the second storage node in response to the data being mirrored to the second storage space;
receiving, from the second storage node, an address of the first storage space in a first mirrored cache associated with the first storage node, the first storage space being allocated in association with a second storage space in a second mirrored cache associated with the second storage node, and the second storage space being allocated by the second storage node in response to the data access request;
accessing the first storage space based on the received address; and
the data is mirrored between the second storage space and the first storage space via a common message link (CMI) between the first storage node and the second storage node.

* * * * *